United States Patent [19]
Nicholas

[11] 3,824,894
[45] July 23, 1974

[54] SERVO-BOOSTERS FOR VEHICLE BRAKE SYSTEMS

[76] Inventor: Stephen John Nicholas, Minster Close, Warwick, England

[22] Filed: Jan. 3, 1973

[21] Appl. No.: 320,759

[30] Foreign Application Priority Data
Jan. 7, 1972 Great Britain ................... 733/72

[52] U.S. Cl. .............................................. 91/369 B
[51] Int. Cl. ............................................... F15b 9/10
[58] Field of Search ........... 91/369 B, 369 A, 369 R

[56] References Cited
UNITED STATES PATENTS

| | | | |
|---|---|---|---|
| 2,828,719 | 4/1958 | Ayers | 91/369 B |
| 3,013,533 | 12/1961 | Brown | 91/369 B |
| 3,183,789 | 5/1965 | Stelzer | 91/369 B |
| 3,316,816 | 5/1967 | Yardley | 91/369 B |

*Primary Examiner*—Edgar W. Geoghegan
*Assistant Examiner*—A. M. Zupcic
*Attorney, Agent, or Firm*—Scrivener Parker Scrivener & Clarke

[57] ABSTRACT

The invention concerns differential pressure operated servo boosters of the type utilizing a deflecting plate adapted to conically distort for transmitting a reaction force to the booster operator, wherein a resilient means is arranged between the deflecting plate and the booster valve to initially transfer the reaction force to the valve body rather than to the valve actuating member to increase initially the degree of opening of the valve and hence to bring about a sharp initial rise in the output characteristic of the booster.

13 Claims, 3 Drawing Figures

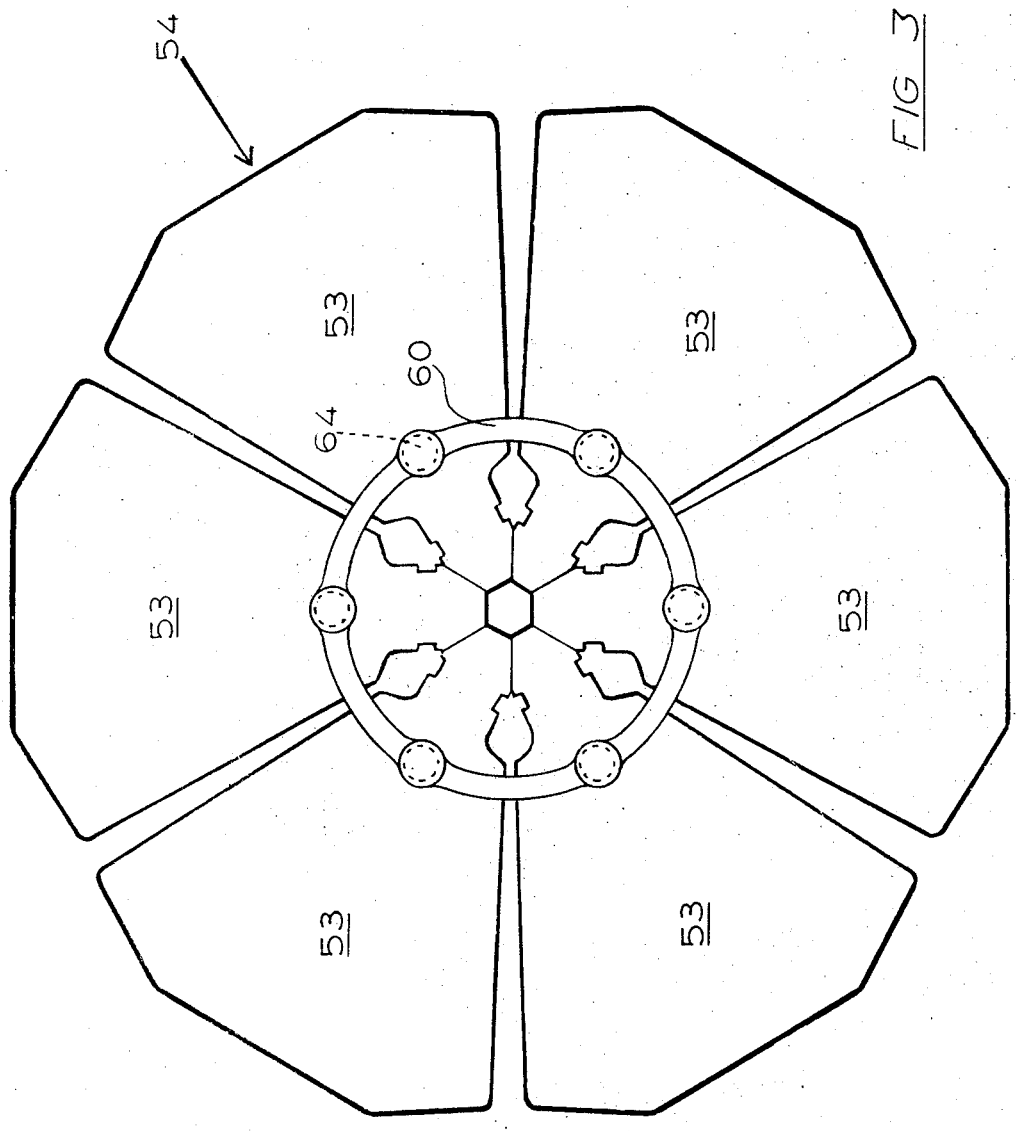

SERVO-BOOSTERS FOR VEHICLE BRAKE SYSTEMS

The present invention provides a booster in which the "system resistance" is overcome with a smaller input effort than has previously been necessary.

This invention concerns differential pressure operated servo-boosters, especially for vehicle braking systems, of the type in which a load-actuating member is displaceable by the application of differential fluid pressures to a movable wall.

Such boosters function under the control of a valve which is arranged to alter the pressure on one side of the movable wall relative to that on the other side. It is desirable to provide on an operating member of the valve a reaction which the operator can sense and which is roughly proportional to the degree of pressure differential established between the two sides of the wall. In a vehicle braking system, the operator then experiences the "feel" of the brakes, which assists him to control the extent to which they are applied.

One convenient way of providing the required reaction or feel is to arrange for the movable wall to be deformed conically or to dish responsive to the pressure differential when the booster is energised and to transmit the reaction resulting from this deformation back to the operator. For this purpose, it has already been proposed to construct the movable wall as an annular elastic diaphragm which is radially and circumferentially supported by a so-called deflecting plate comprising a plurality of rigid, individual radial fingers carried in mutually flexing relation by support means which maintains the fingers in regularly circularly spaced and radially fixed locations, thereby to define a radially slotted, annular plate.

In boosters of this type a relatively high "system resistance", for example due to friction within the booster caused by seals, return spring loads etc., is often incurred which has the effect that a significant load must be applied to the booster input before the "system resistance" is overcome and any output is obtained. Once the "system resistance" has been overcome and an output is obtained, the characteristic curve of output/input does not pass through the origin, as would be the ideal case, but proceeds from the input quantity necessary to overcome the "system resistance". This is explained further hereinafter with reference to FIG. 2 of the accompanying drawings.

It is an object of the present invention to provide a booster in which the "system resistance" is overcome with a smaller input effort than has previously been necessary.

In accordance with the present invention there is provided a differential pressure operated servo-booster having a load-actuating member which is displaceable by the application of differential fluid pressure under the control of a valve and applied across a movable wall comprising an annular elastic diaphragm supported by a deflecting plate adapted to be conically distorted during operation of the booster for transmitting a reaction force to the booster operator by way of an actuating member of the valve, the valve having a body member having at least one valve seat with the improvement comprising resilient means which are effective between the deflecting plate and the body member of the valve upon opening thereof to initially transfer the reaction force arising from conical deformation of the movable wall to the valve body rather than to the valve actuating member so as to cause displacement of the valve body relative to the valve actuating member and increase the degree of opening of the valve so as to bring about a sharp initial rise in the output characteristic of the booster.

Preferably, the deflecting plate is in the form of a radially slotted annular plate, the radially inner end of the plate being spaced, in a direction parallel to the booster axis, from a thrust member connected to said actuating member of the valve and said resilient means being located on said body member of the valve, which means is adapted to be engaged and compressed by the deflecting plate when the valve is actuated such as to cause the valve body member to move in a direction to increase the activation of the valve before the deflecting plate engages the thrust member to thereafter transfer the reaction direct to the valve actuating member.

Conveniently, said resilient means comprises an annular member mounted on the valve body member so as to project from an end surface thereof towards the deflecting plate.

The invention will be described further, by way of example, with reference to the accompanying drawings, in which:

FIG. 3 is a vertical elevational view of a deflecting plate constructed in accordance with the invention.

Figure 1:
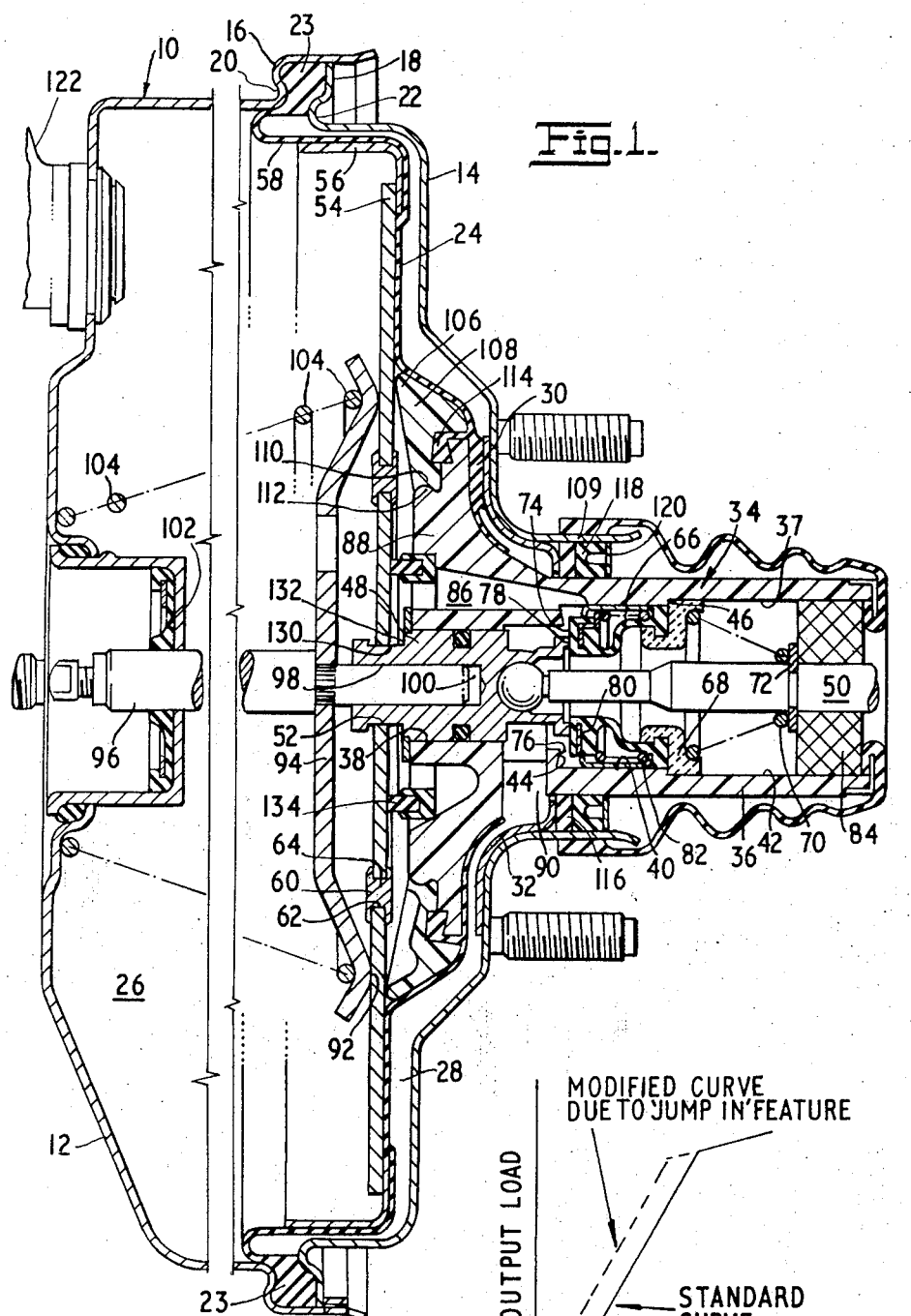
FIG. 1 is a section through one embodiment of a servo booster constructed in accordance with the present invention.

The servo-booster of FIG. 1 has a housing, generally designated by the reference numeral 10, which is made up of two cylindrical, cupped parts 12 and 14 whose peripheries are formed with respective radially outwardly directed flanges 16, 18 including respective bead portions 20 and 22 between which is clamped the thickened outer peripheral edge 23 of an elastic diaphragm 24 serving to divide the interior of the housing 10 into two fluid chambers 26 and 28. Intermediate its inner and outer edges, the elastic diaphragm 24 is formed with a thickened annular abutment 30 which, in the unoperated state of the booster, bears against a radially extending portion of the end wall of the housing part 14 via the intermediary of a generally annular member 32, referred to hereinafter as the bearing retainer 32.

The booster includes a poppet valve arrangement, indicated generally by the reference numeral 34, which includes a generally cylindrical valve body 36 having an internal bore 37 which extends axially of the booster housing. The internal bore of the valve body 36 is formed with three portions 38, 40, 42 of different diameters separated by two shoulders 44 and 46, the rearward portion 42 (right-hand side as viewed in FIG. 1) being of greatest diameter and the forward portion 38 being of smallest diameter. Slidably received in the bore portion 38 is a cylindrical thrust member 48 whose rearward end is formed with a ball socket which receives a corresponding ball on the forward end of a valve actuating rod 50. The forward end of the thrust member 48 projects beyond the bore portion 38 and receives in a peripheral groove 52 therein the radially inner ends of a plurality of rigid, radially extending, outwardly divergent fingers 53 together forming a deflecting plate 54.

The rearward facing surface of the radially outer portions of the fingers forming the deflecting plate 54 serve as a support for a radially extending portion of the elastic diaphragm 24, the ends of said outer portions of the fingers being themselves supported by a flanged ring 56 which is fitted within an axially directed portion 58 of the elastic diaphragm 24 by which the outer peripheral edge 23 of the diaphragm is joined to said radially extending part thereof.

The rigid radially extending fingers forming the deflecting plate 54 are individual carried in mutually flexing relation by means of an annular support ring 60 of plastics material. Each finger is provided with an aperture 62 through which extends a respective projection 64 formed on the support ring 60, the free ends of the projections 64 extending beyond the apertures 62 being rivetted over to thereby attach the fingers to the support ring.

Located within the intermediate bore portion 40 of the valve body 36 is an axially flexible valve closure member 66 whose rearward, thickened end is rigidly clamped to said bore by means of a clamp 68 which is urged against the shoulder 46 by a coil spring 70 acting between this clamp 68 and a collar 72 attached to the valve actuating rod 50. The forward end of the valve closure member 66 is also thickened and provides a flat, radially extending surface 74, which can cooperate both with an outer cylindrical valve seat 76 formed by said shoulder 44 and an inner, cylindrical valve seat 78 formed on the rearward end of the thrust member 48. The interior of the forward thickened portion of the valve closure member 66 is provided with a generally annular stiffening ring 80 whose radially outer end is castellated and is engaged by an axially extending spring 82 which acts between this stiffening ring 80 and the rigidly clamped rearward thickened portion of the valve closure member 66 to urge the forward thickened portion thereof towards said valve seats 76 and 78.

The rearward end of the valve body bore communicates with the atmosphere via an air filter 84. The valve seat 76 communicates with the front chamber 26 of the booster housing via a passage 86 in a thickened portion 88 of the valve body 36 and via spaces between the fingers forming the deflecting plate 54. The rearward chamber 28 of the booster housing communicates via grooves in the thickened portion 30 of the diaphragm 24 with a chamber 90 located in the thickened portion 88 of the valve body 36 forwardly of the valve seat 76.

Intermediate their ends, the fingers forming the deflecting plate 54 are engaged on their forward side by a circular fulcrum 92 formed adjacent the periphery of a circular fulcrum plate 94 centrally mounted on an output rod 96 of the booster and on their rearward side by a forwardly projecting lip 106 of a ring 108, referred to as the sensing ring 108, which is mounted on the thickened portion 88 of the valve body 36. The rearward end of the output rod 96 is slidably received in a bore 98 in the thrust member 48, with an axial clearance 100 left between the inner end of this bore 98 and the rearward end surface of the rod 96, and the forward end of the rod 96 passes out of the forward end wall of the housing part 12 through a fluid tight gland 102. The fulcrum plate 94 is biassed against the deflecting plate 54 by means of a coil spring 104.

The sensing ring 108 is located generally radially outwardly of the thickened portion 88 of the valve body 66 and is attached thereto by means of interlocking snap-fit portions 110, 112. An annular projecting portion 114 of the elastic diaphragm 24 is clamped between the thickened portion 88 and the sensing ring 108 to rigidly locate the diaphragm relative to the valve body.

An axial clearance 130 is provided between the initial position of the inner ends of the fingers forming the deflecting plate 54 and the cooperating abutment surface 132 of the thrust member 48. Furthermore, a resilient annular member 134 is mounted on the thickened portion 88 of the valve body 36 so as to lie between this thickened portion and the deflecting plate 54.

In order to enable the valve body 36 to slide relative to the housing 10, a fluid tight bearing 116 is located around the valve body 36 in a rearwardly extending, cylindrical extension 109 of the housing part 14 and is clamped between the bearing retainer 32, which is fixed to the housing part 14, and a seal 118 by a retainer 120.

The above described booster operates as follows. In the unactuated state of the booster (FIG. 1), the thrust member 48 is urged towards the right, as viewed in FIG. 1, by virtue of the force exerted by the spring 104 through the deflecting plate 54, so that the valve seat 78 on the thrust member engages the surface 74 on the valve closure member 66 urging the latter to the right. Under these conditions, both interior chambers 26 and 28 of the housing are isolated from the atmosphere by the first poppet-type valve, formed by the aforementioned members 74, 78, but the two chambers 26 and 28 are connected together via the chamber 90, the passage 86 and an open, second poppet-type valve formed by the other valve seat 76 and the surface 74 of the valve closure member 66. Both chambers 26 and 28 are connected to vacuum in this condition of the booster by way of a vacuum connection 122 and the booster is said to be in its vacuum-suspended state.

Movement of the actuating rod 50 to the left, for example by operation of a foot pedal, causes the thrust member 48 to follow. During this movement, the first poppet valve remains closed due to the action of the spring 82. Eventually the surface 74 of the valve closure member 66 engages the valve seat 76 so hat the second poppet valve closes so isolating the chambers 26, 28 from one another. Further movement of the thrust member 48 to the left causes the valve seat 78 to part from the surface 74 thus opening the first poppet valve and connecting the rearward chamber 28 to atmosphere. The pressure-differential so developed across the diaphragm then acts to displace the diaphragm and deflecting plate 54 to the left against the force of the spring 104, this movement being transferred to the output rod 96 via the fulcrum plate 94. The magnitude of the pressure differential developed across the diaphragm, and hence the output force applied to the brakes, is dependent upon the degree of opening of the first poppet valve comprised by the parts 74, 78 and thus upon the magnitude of the axial movement of the input rod 50.

The forces applied to the deflecting plate 54 as a result of the differential pressure cause this plate to conically distort about the fulcrum 92 thereby exerting a rearwardly directed reaction force which would conventionally be applied directly to the thrust member and hence to the actuating rod 50 to comprise "feel" of the brake for the operation.

Figure 2:
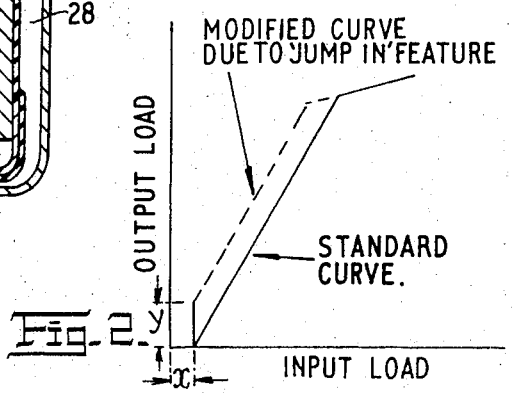
FIG. 2 is a graph of the input load/output load curve obtainable with the booster of FIG. 1.

As illustrated in FIG. 2, in a conventional booster an input load of x must be applied to the input rod 50 before any significant output at all is obtained. This is due to the "system resistance" of the booster referred to above which has do be overcome before the booster operates to provide an output. Once the "system resistance" has been overcome, the output follows a characteristic identified by the "standard curve" of FIG. 2. Thus, the operating characteristic of the booster is effectively displaced to the right in FIG. 2 and a greater input than would ideally be necessary must be applied to obtain a given output.

However, due to the provision of the resilient annular member and the clearance 130 at the inner ends of the fingers, the reaction from the deflecting plate 54 in the present embodiment is initially transferred through the resilient member 134 to the valve body 36 rather than to the thrust member 48. This action causes the change over of the poppet valves to occur almost instantaneously and a "jump" in the characteristic curve occurs, as shown at y in FIG. 2. The "modified curve" is then followed as the pressure differential across the movable wall increases, the resilient member 134 being progressively compressed into the valve body whereby the fingers eventually engage the surface 132 of the thrust member and the standard characteristic is thereafter followed.

In the present embodiment, when the first poppet valve comprising the parts 74, 78 initially opens so that a relatively small pressure differential is developed across the diaphragm 24, the deflecting plate 54 conically distorts about the fulcrum 92 as before, with the individual fingers forming the deflecting plate pivoting counter clockwise about the fulcrum 92 as viewed in FIG. 1. Thus, the outer ends of the fingers move to the left, as viewed in FIG. 1 and the inner ends move to the right. By virtue of the provision of the gap 130, this initial movement of the inner ends of the fingers is not sufficient for them to engage the surface 132 on the thrust member 48 so that initially the aforementioned conventional reaction is not transferred back to the input rod 50. Instead, the movement of the inner ends of the fingers to the right is transmitted to the valve body 34 via the resilient ring 134. It will be apparent that the latter movement of the valve body 34 is effective to displace the valve closure member 66 to the right by virtue of the engagement of the valve seat 76 carried by the valve body 34 with the closure member 66, the displacement of the valve closure member being effective to open further the first poppet valve comprised by the parts 74, 78, so admitting more air to the righthand chamber 28, increasing the pressure differential across the diaphragm, and causing a sharp increase in the output of the booster. This sharp increase occurs almost instantaneously once the first poppet valve begins to open and is indicated by the amount "y" in FIG. 2. Since the ring 134 is resilient, it undergoes progressive compression during this operation and eventually the compression is sufficiently great for the inner ends of the fingers to engage the surface 132 of the thrust member 48 so that the valve body is no longer displaced to the right relative to the first poppet valve but a reaction is applied to the input 150 via the thrust member 48, as in the conventional arrangement. Thereafter, the operation of the booster is as if the ring 134 were absent and a characteristic is obtained substantially identical in scope to the "standard curve". The modified curve of FIG. 2 having a "jump" portion is thus obtained for the booster having the ring 134.

In the present embodiment, the lip 106 of the sensing ring is located substantially opposite the fulcrum 92 and the sensing ring has little effect itself on the operation of the booster. However, if the diameter of the lip 106 is arranged to be greater than that of the fulcrum 92, it will be apparent that once the inner ends of the fingers engage the surface 132 on the thrust member 48 and the thrust member is thereafter moved to the left by further actuation of the input rod 50, the fingers are pivoted by a small amount in a clockwise direction about the fulcrum 92 whereby their outer ends move to the right and displace the valve body to the right by a corresponding amount by virtue of the contract of the fingers with the lip 106. The first poppet valve 74, 78, which at this stage of operation is partially opened, is thus opened further by the action of the valve body displacing the closure member 66 to the right via the valve seat 76 in contact therewith.

Thus, by making the lip 106 to be of greater diameter than the fulcrum 92, the valve 74, 78 can be arranged to open to a greater extent for a given displacement of the input rod 50.

In a similar manner, it will be appreciated that if the diameter of the lip 106 is arranged to be smaller than that of the fulcrum 92, the valve body will be allowed to move to the left when the fingers are pivoted in a clockwise direction by engagement with the thrust member 48, whereby the valve 74, 78 will open to a lesser extent for a given displacement of the input rod 50.

The change in the operating characteristic provided by this feature is known as "lost travel" and, as described above, is determined by the diameter of the sensing ring lip 106. In the present embodiment where the lip 106 of the sensing ring is located substantially opposite the fulcrum 92, the conical deflection did not itself directly result in the movement of the valve body.

The above described "jump-in" feature of the present invention is especially useful in a braking system in which the "system resisance" is high and it enables a high output to be initially obtained for a small input.

It will be observed in the arrangement described above that, in the event of servo failure, a metal to metal contact is obtained between the input and output rods.

Although the embodiment described above employs a poppet-type valve, the provision of a "jump-in" characteristic could equally well be obtained in a similar manner in a booster in which the valve controlling the differential pressure across the movable wall comprises a pair of concentric valve seats which are selectably engageable by a common valve closure member which is conically deformable with said deflecting plate about the whole circumference of a selected one of said seats in order to open a fluid flow passage associated with the other seat.

I claim:

1. In a differential pressure operated servo booster having a load-actuating member which is displaceable by the application of differential fluid pressure, under the control of a valve, across a movable wall comprising an annular elastic diaphragm supported by a deflecting plate adapted to conically distort during operation of the booster for transmitting a reaction force to the booster operator by way of an actuating member of the valve, the valve having a body member bearing at least one valve seat, the improvement comprising resilient means effective between said deflecting plate and said body member of the valve, on opening of the valve, to initially transfer said reaction force, arising from conical deformation of the movable wall, to the valve body rather than to the valve actuating member whereby to cause displacement of the valve body relative to said valve actuating member, said displacement of the valve body being arranged to increase the degree of opening of the valve and hence to bring about a sharp initial rise in the output characteristic of the booster.

2. A servo booster according to claim 1 in which the deflecting plate comprises a plurality of rigid radially extending fingers carried in mutually displaceable relation by a support means which maintains the fingers in regularly circularly spaced and radially fixed locations, and in which said support means comprises an annular disc of flexible material, a plurality of circularly spaced projections being formed on said annular disc which extend through respective holes in the fingers and are expanded at their free ends projecting beyond the holes in the fingers to thereby attach the fingers to the flexible disc.

3. A servo booster according to claim 1 further comprising a thrust member connected to said actuating member of the valve, the deflecting plate being in the form of a radially slotted annular plate, the radially inner end of which is spaced, in a direction parallel to the booster axis, from said thrust member and said resilient means being located on said body member of the valve, the resilient means being adapted to be engaged and compressed by the deflecting plate when the valve is actuated such as to cause the valve body member to move in a direction to increase the activation of the valve before the deflecting plate engages the thrust member to thereafter transfer the reaction direct to said valve actuating member.

4. A servo booster according to claim 2 in which said resilient means comprises an annular member mounted on the valve body member so as to project from an end surface thereof towards the deflecting plate.

5. A servo booster according to claim 2 in which the flexible disc is formed of a plastics material and said projections are integral therewith.

6. A servo booster according to claim 5 in which a single projection is provided for each finger.

7. A servo booster according to claim 6 in which the free end of each projection extending beyond the hole in a finger is rivetted over to thereby attach the fingers to the annular disc.

8. A servo booster according to claim 7, in which the fingers are of uniform size and shape, the particular size and shape in a given instance depending on the size of the booster and the load to be transmitted.

9. A servo booster as claimed in claim 1 in which the valve is of the poppet type having at least one of relatively axially displaceable, spring biassed valve seat and closure members.

10. A servo booaster according to claim 9 in which the poppet valve includes a flexible, annular valve closure member which is located within a central bore in said valve body member, one end of the closure member being sealingly fixed to the internal surface of said bore and the other end presenting a flat, annular surface adapted to selectably co-operate with a circular valve seat formed on a reduced diameter portion of said bore and a circular valve seat formed on a rearward end of said thrust member which is axially slidable in said bore under the control of said valve operating member, at a location forwardly of said reduced diameter portion.

11. A servo booster according to claim 10 in which one end of the valve body of the poppet valve engages the annular deflecting plate, at a location intermediate the radially inner and outer ends thereof, by way of an annular sensing ring rigidly connected to said valve body.

12. A servo booster according to claim 11 in which the movement of the differential pressure operated wall is transmitted to an output member of the booster by way of a spring-loaded fulcrum plate providing a circular fulcrum which engages the forward side of the deflecting plate forming part of said wall.

13. A servo booster according to claim 12 in which the diameter of said sensing ring which engages the rearward side of the deflecting plate is arranged to govern the degree of "lost travel" within the servo.

* * * * *